(12) United States Patent
Dowding et al.

(10) Patent No.: US 6,390,080 B1
(45) Date of Patent: May 21, 2002

(54) INTAKE MANIFOLD WITH A HEATED PCV PASSAGE

(75) Inventors: Peter J. Dowding, Bloomfield Hills, MI (US); Darrell Charles Drouillard, Tecumseh (CA)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,619

(22) Filed: Sep. 28, 2001

(51) Int. Cl.[7] ............................................. F02M 25/02
(52) U.S. Cl. ...................................... 123/572; 123/573
(58) Field of Search ................................. 123/572, 573, 123/574, 184.21–184.41

(56) References Cited

U.S. PATENT DOCUMENTS

| | | | | |
|---|---|---|---|---|
| 4,064,850 A | * | 12/1977 | Nakagawa et al. | 123/184.42 |
| 4,073,271 A | * | 2/1978 | Yamazaki et al. | 123/181.42 |
| 4,768,493 A | * | 9/1988 | Ohtaka et al. | 123/573 |
| 5,499,604 A | | 3/1996 | Ito et al. | |
| 5,970,962 A | | 10/1999 | Nelson et al. | |

* cited by examiner

*Primary Examiner*—Marguerite McMahon
(74) *Attorney, Agent, or Firm*—Carlos Hanze

(57) ABSTRACT

An intake manifold 7 for an internal combustion engine is provided which has an intake venturi passage 34 for throttled passage of filtered air into a plenum 44. A crankcase ventilation passage 70 is provided having a first end 72 intersecting with the venturi passage 34 and a second end 74 intersecting with an outer boundary of the manifold. A heat pipe 82 is adjacent a major portion of the crankcase ventilation passage 70 between the first and second ends 72, 74 for transfer of thermal energy to prevent freeze up in the crankcase ventilation passage 70.

8 Claims, 6 Drawing Sheets

INTAKE MANIFOLD WITH A HEATED PCV PASSAGE

BACKGROUND OF THE INVENTION

The present invention relates to intake manifold assemblies for reciprocating piston internal combustion engines and, in particular, to intake manifold assemblies fabricated from a polymeric material for internal combustion engines with positive crankcase ventilation.

Most automotive vehicles presently in production utilize an internal combustion reciprocating piston engine operating under an Otto cycle. The engine has an engine block with a plurality of cylindrical combustion chambers. A piston is slidably mounted within each combustion chamber. The piston is pivotally connected to a rod which is in turn pivotally connected to a crankshaft. To seal the combustion chamber each piston has an O-ring(s) fitted within an annular groove in a cylindrical side of the piston. During an intake stroke of the piston the crankshaft pulls the piston rod downward to induce a vacuum within the combustion chamber. The induced vacuum pumps a charge through an inlet valve into the combustion chamber. On a compression cycle, the inlet valve is closed and the piston is pushed upward by the piston rod providing a compression ratio typically exceeding 8:1. Upon ignition of the charge within the combustion chamber, the piston is pushed downward by the combustion energy. After combustion is virtually or totally complete, an exhaust valve opens and the crankshaft pushes the piston upwards to exhaust the charge and the cycle is then repeated.

During the compression and combustion cycles, very high gas pressure is experienced on the O-ring resulting in slight leakages of gas, often referred to as blow by. The blow by, which includes air, fuel, vapor and combustion byproducts, increases the pressure within the engine block which is exposed to the oil pan. If the blow by is not relieved, it will force the oil in the oil pan to escape via the dip stick and the engine will thus lose lubrication. To prevent the loss of lubrication, the blow by, prior to four decades ago was typically simply vented to the atmosphere.

In a genesis of emission control systems for automotive vehicles approximately 3–½ decades ago, positive crankcase ventilation (PCV) was brought forth. PCV uses engine vacuum to draw fresh air through the crankcase. The fresh air enters through an air filter or through a separate PCV breather filter located in the interior of the air filter housing.

When the engine is running, intake manifold vacuum is applied to a PCV valve. The vacuum moves air through a hose into a rocker arm cover. From this location air flows through a cylinder head opening into the crankcase, where it mixes with the blow by. The mixture of blow by and induced air travels up through the cylinder head opening to the open PCV valve. Intake manifold vacuum moves the blow by and air mixture past the PCV valve into a hose connected with the intake manifold. The blow by and air mixture is then combined with the intake charge and enters the combustion chambers where they are burned.

In the most recent decade, there has been an increasing tendency to utilize polymeric, high-temperature, fiber-reinforced plastic intake manifolds for internal combustion engines. Polymeric manifolds have several advantages over prior tubular aluminum, cast aluminum or cast iron intake manifolds. The first advantage is that plastic manifolds do not require any significant machining, as did the prior aluminum or cast iron intake manifolds. Polymeric manifolds are lighter than their prior metallic counterparts and can be formed for production vehicles in a more accurate manner providing greater control of the flow path of incoming air and, as such, enhance the thermal dynamic efficiency of the engine.

In very cold climate conditions, there can be a freeze up in the connection of the PCV hose with the intake manifold. To alleviate possible conditions of freeze up, some PCV systems have a fitting that is heated by engine coolant at the point of intersection between the PCV hose and the manifold.

Many intake manifolds now also incorporate the air filter housing. Incorporation of the air filter housing lowers the overall cost of the two components. However, inclusion of the air filter housing causes the distance separating the PCV hose connection from the intake venturi of the intake manifold to be greater, resulting in two separate openings which can potentially freeze up in very cold weather.

It is desirable to provide an apparatus and method of utilization thereof for an intake manifold used with a PCV system having a relatively long passage between its intersection with the intake venturi and its intersection with the outer housing or boundary of the intake manifold.

SUMMARY OF INVENTION

To make manifest the above noted desire a revelation of the present invention is brought forth. In a preferred embodiment, the present invention provides a reciprocating piston internal combustion engine intake air manifold. The manifold has an intake venturi for throttled passage of filtered air into a plenum. The intake manifold has a positive crankcase ventilation passage having a first end intersecting with the venturi passage and a second end intersecting with an outer boundary of the manifold. A distance between the first and second ends of the positive crankcase ventilation passage is a major portion of a diameter of the venturi passage. A heat pipe is also provided adjacent a major portion of the ventilation passage. The heat pipe transfers thermal energy to the ventilation passage. The heat pipe prevents freeze up in the ventilation passage at the point of connection of the PCV hose and also at the point of the PCV passage intersection with the venturi passage. Additionally, the heat pipe aids in the prevention of freeze up of a throttle body positioned in the venturi passage. The heat pipe has a portion which is heated by contact with engine coolant.

It is an advantage of the present invention to provide a manifold having a PCV passage which is heated by a heat pipe. It is an advantage of the present invention to provide an internal combustion engine air intake manifold as above described which is fabricated from a polymeric material.

Other advantages of various embodiments of the present invention will become more apparent to those skilled in the art from the reading of the following detailed description and upon reference to the drawings.

DETAILED DESCRIPTION

Figure 1:
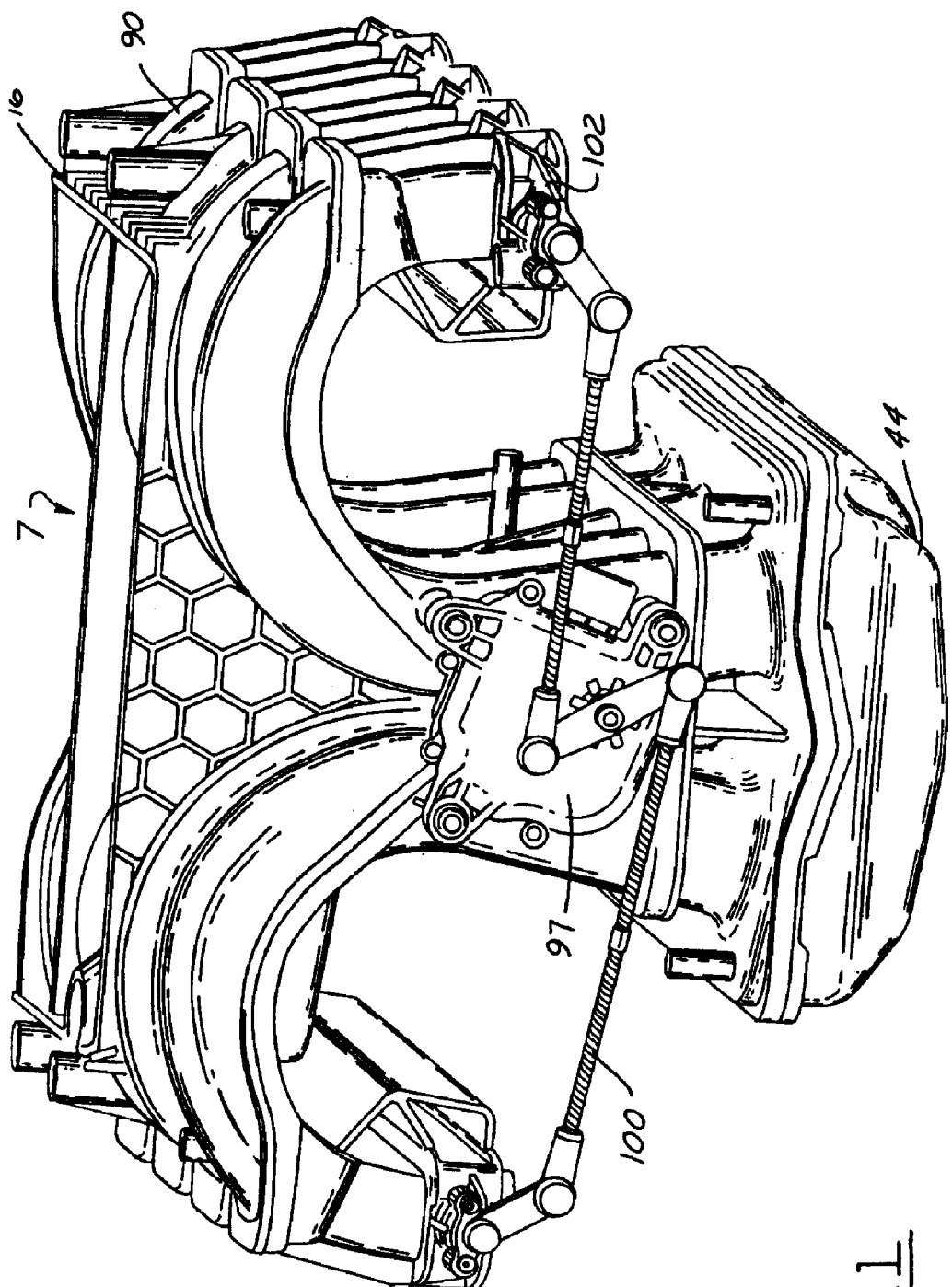
FIG. 1 is a perspective view of an internal combustion engine intake manifold according to the present invention.
Figure 2:
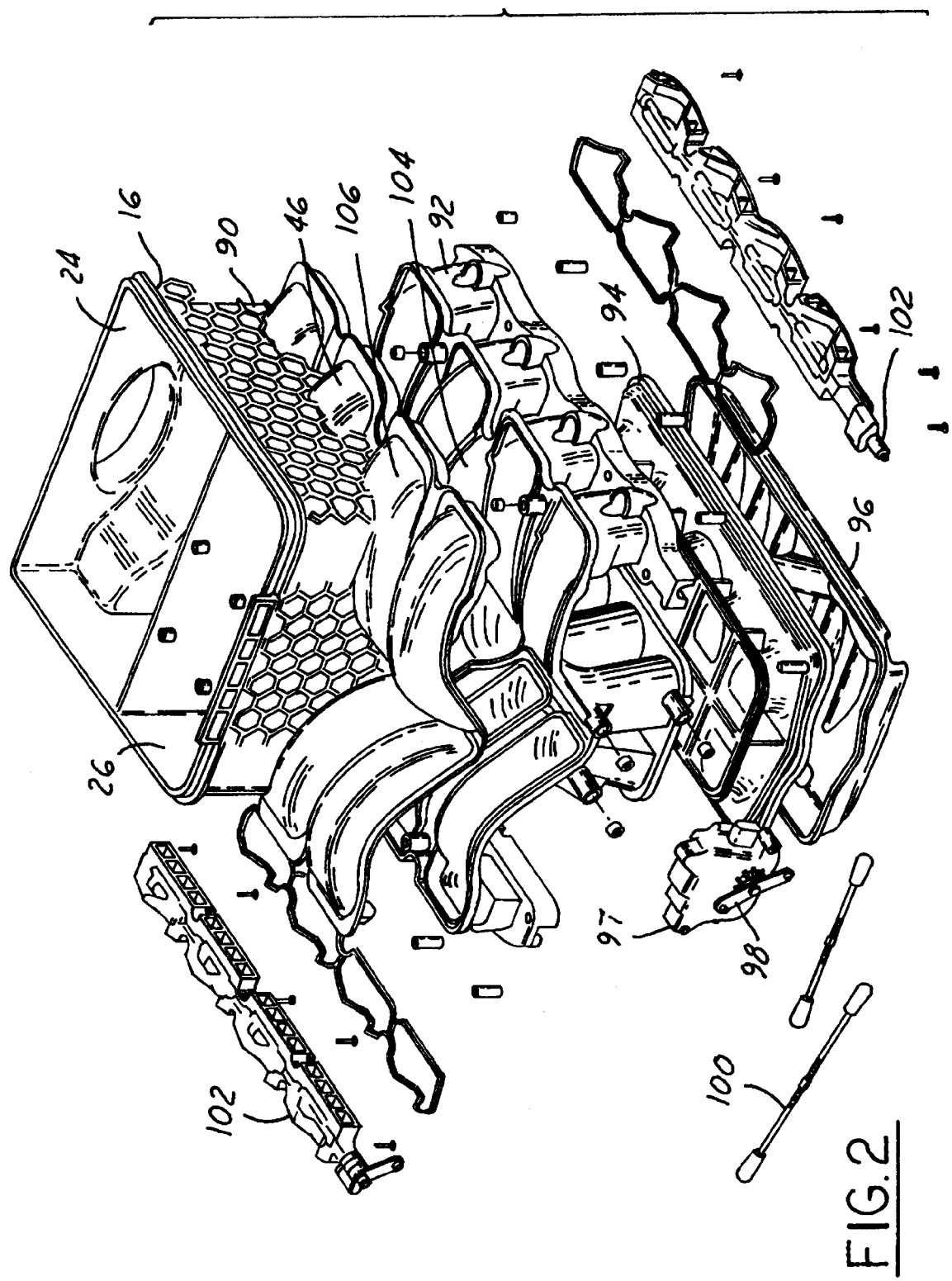
FIG. 2 is an exploded view of the intake manifold shown in FIG. 1.
Figure 3:
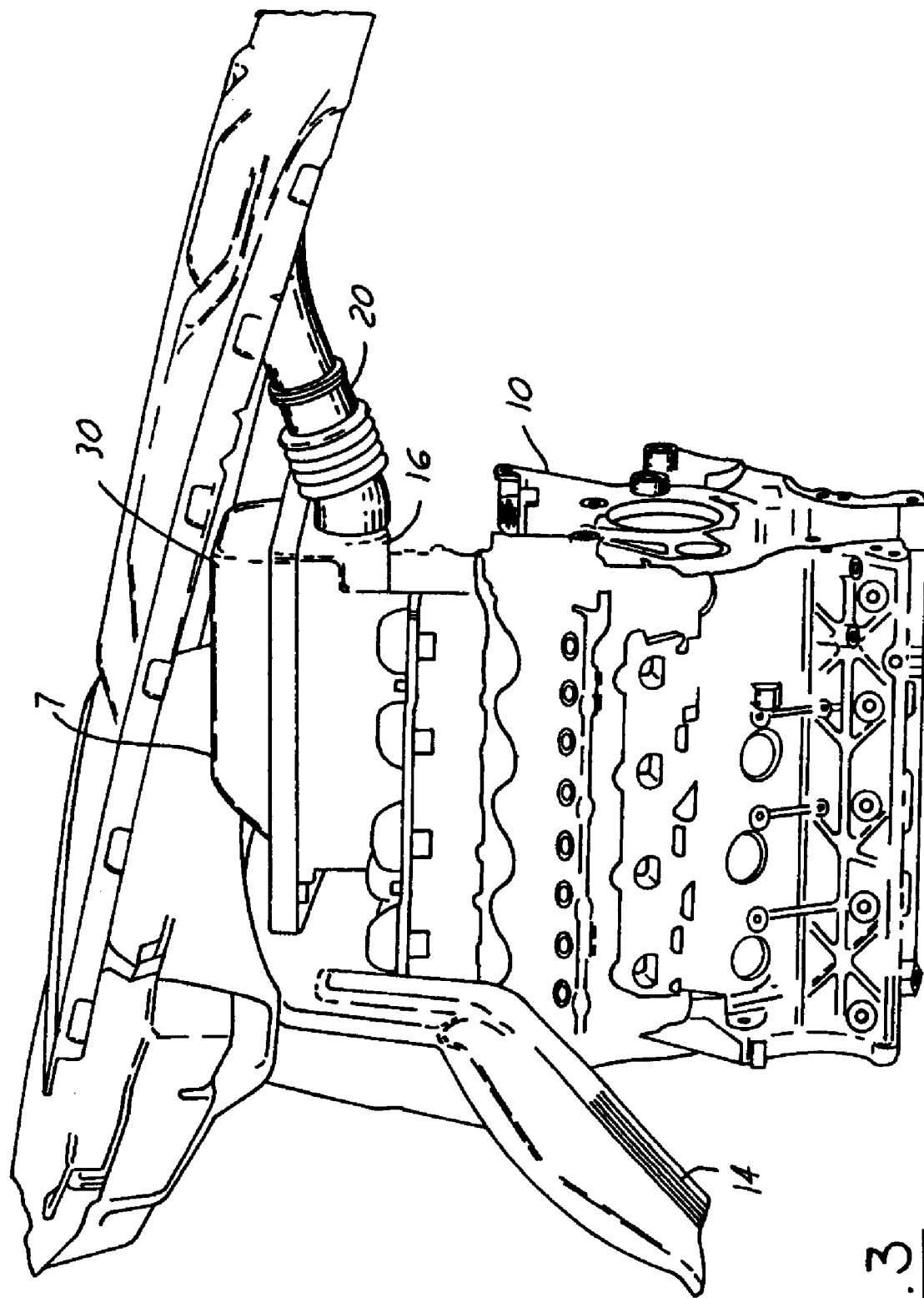
FIG. 3 is a perspective view of the internal combustion engine intake manifold in FIGS. 1 and 2 shown in the environment of a full-size truck vehicle engine compartment.

FIGS. 1–5 show the intake manifold assembly 7 according of the present invention mounted on top of an internal combustion engine 10. The engine 10 is mounted within an engine compartment of a full-size pick up truck. A dash panel 14 abuts a rear end of the engine 10. The engine 10 as shown is a V8 engine.

The intake manifold 7 has a main housing 16. The main housing 16 has a front air entrance port 18 connected with an incoming air hose 20. The housing 16 has an upper divider plate 22. The divider plate deforms a rear wall of an induction chamber 24. Rearward of the divider plate 22 is a throttle chamber 26. The housing 16 has a mounting frame face 28. The frame face 28 mounts an air filter housing 30. The air filter housing has a series of lateral slots (not shown) which are fitted over lateral studs 32 supplied on the main housing 16. A generally flat filter membrane 33 provides a top cover for the induction chamber 24 and the throttle chamber 26. Filter membrane 33 has a fine mesh portion 35 which is fitted over the induction chamber 24, and a generally open portion 37 which provides a generally open net over the throttle chamber 26.

In operation, air travels through incoming air hose 20 and enters into the induction chamber 24 via the port 18. The bottom portion of the induction chamber 24 is closed off. Air from the induction chamber 24 travels vertically upward through the air filter membrane 33. Air which is passed through the air filter membrane fine mesh portion 35 then occupies the space provided by the air filter housing 30. The air is then passed through the air filter membrane open portion 37 into the throttle chamber 26. The throttle chamber 26 is fluidly connected with an intake venturi passage 34.

Figure 4:
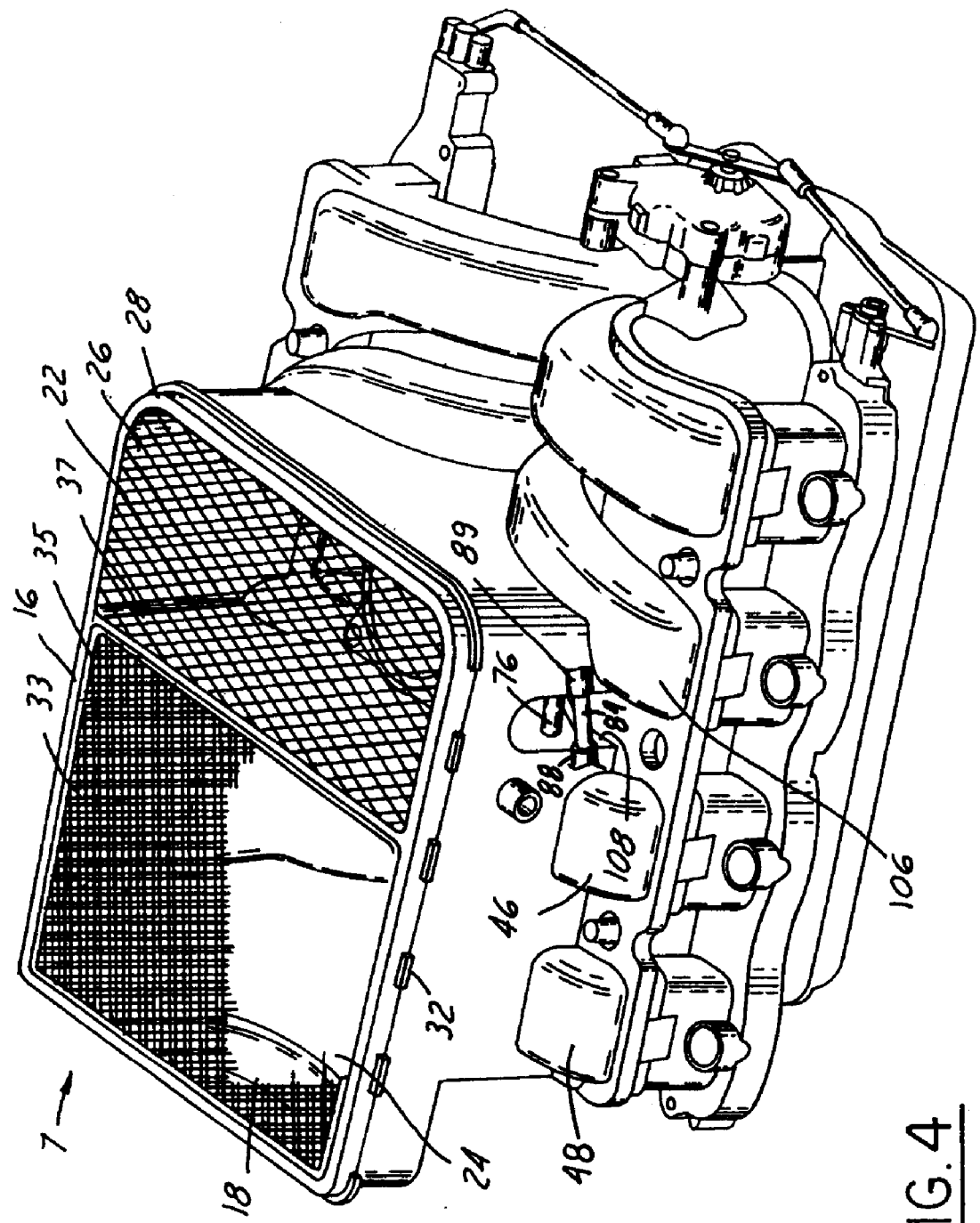
FIG. 4 is an enlarged view taken from the side and rear of the intake manifold shown in FIG. 2 with portions of the air filter housing removed for clarity of illustration.
Figure 5:
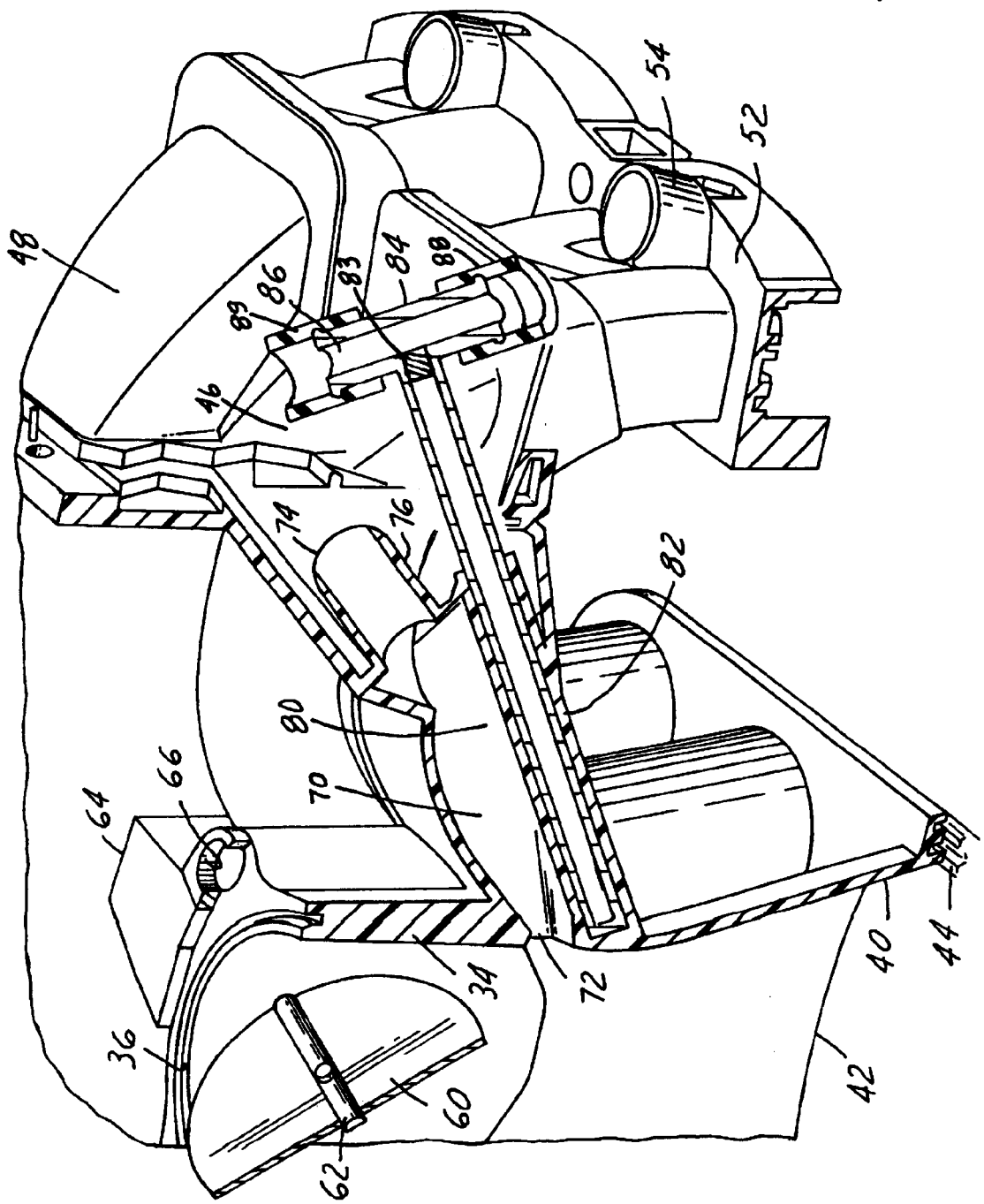
FIG. 5 is a sectional view of the intake manifold shown in FIG. 1.

Turning to FIGS. 4–5, the intake venturi passage 34 has an upper end 36, and a divergent portion 40. Beneath a neck 42 of the divergent portion, the manifold has a plenum 44. The plenum 44 is fluidly connected with runners 46, 48. The runners 46, 48 travel along a semi-circular path intersecting with a mounting flange 52. The mounting flange is connected on top of the cylinder head of engine 10. The flange 52 has intersecting therewith a series of necks 54 for the insertion therein of fuel injectors.

Connected to the venturi passage 34 is a throttle plate 60. The throttle body plate 60 rotates on a throttle shaft 62. The throttle shaft 62 penetrates the venturi passage 34 and is controlled by a throttle body actuator 64. The throttle body actuator 64 mounts to the manifold via fastener holes 66. The throttle body actuator 64 is controlled by an engine control module (not shown).

The manifold 7 has a positive crankcase ventilation passage 70. The positive crankcase ventilation passage 70 has a first end 72 which intersects with the venturi passage 34. The intersection with the venturi passage 34 would typically be 70–100 mm below the throttle body plate 60. The positive crankcase ventilation passage 70 also has a second end 74. The second end 74 is supplied by a neck 76. The neck 76 intersects with the outer boundary of the manifold 7 and provides a port to connect with a PCV hose (not shown).

In cold conditions the first and second ends 72, 74 provide the greatest potential for condensation of the vapors within the blow by gas. A distance between the first and second ends 72, 74 is a major portion of a diameter of the venturi passage 34. As shown in FIG. 5, the passage 70 is configured for connection with the PCV system of the vehicle. However, passage 70 in other embodiments of the present invention, can additionally be used for a fuel vapor canister purge function. Vapors from the fuel vapor canister purge system are also delivered to the combustion chamber in order to reduce vehicle emissions.

The manifold 7 also has a heat generator 80. The heat generator 80 is provided by a metallic heat pipe 82. Heat pipe 82 is a hollow ½ inch or ⅜ inch OD tube. The heat pipe has a plug 83 to prevent fluid passage through the heat pipe 82. The heat pipe 82 is sonically welded or molded in position with the polymeric material of the remainder of the manifold 7. The heat pipe is adjacent a major portion of the positive crankcase ventilation passage 70. The heat pipe transfers thermal energy to the positive crankcase ventilation passage 70 to prevent freeze-up about the first and second ends 72, 74. The heat pipe 82 additionally transfers thermal energy to the throttle body plate 60 and other portions of the throttle body to prevent freeze-up of the throttle body plate 60.

The heat pipe 82 has a T-head 84 with side apertures 86 to allow for the flow of engine coolant. The engine coolant is utilized to transfer heat to the heat pipe 82. The engine coolant travels through the side apertures 86 via connected coolant hoses 88, 89. Appropriate fluid tight connections provided with the T-head 84 allow for connection of coolant hoses 88, 89 to the manifold.

Referring back to FIGS. 1, 2 and 4, the manifold 7 is fabricated from multiple polymeric pieces sonically welded together. As mentioned previously the manifold 7 has a main housing 16. Main housing 16 is formed by an upper molding or top portion 90. Top portion 90 includes the induction chamber 24, throttle chamber 26 and a top portion of the runners 46, 48. Top portion 90 is adjoined to an intermediate portion 92. Intermediate portion 92 is adjoined to a plenum top 94. The plenum top 94 is adjoined to a plenum base 96. Along a rear end of manifold 7, is an actuator 97. The actuator 97 has a pivoting arm 98 which is joined with connector arms 100. Connector arms 100 control charge motion control valves 102.

When the top portion 90 is adjoined to the intermediate portion 92, a pocket area 104 is formed between adjacent runners 46, 106. Crankcase ventilation passage 70 is formed between the top portion 90 and the intermediate portion 92 in pocket area 104 on a side of manifold 7 opposite the side shown in FIG. 2. As best shown in FIG. 4, between the runners 46, 106 the housing 16 has an arched window 108. The arched window 108 allows for access to the neck 76 for attachment of the PCV hose and also allows for the outward extension of the heat pipe 82.

Figure 6:
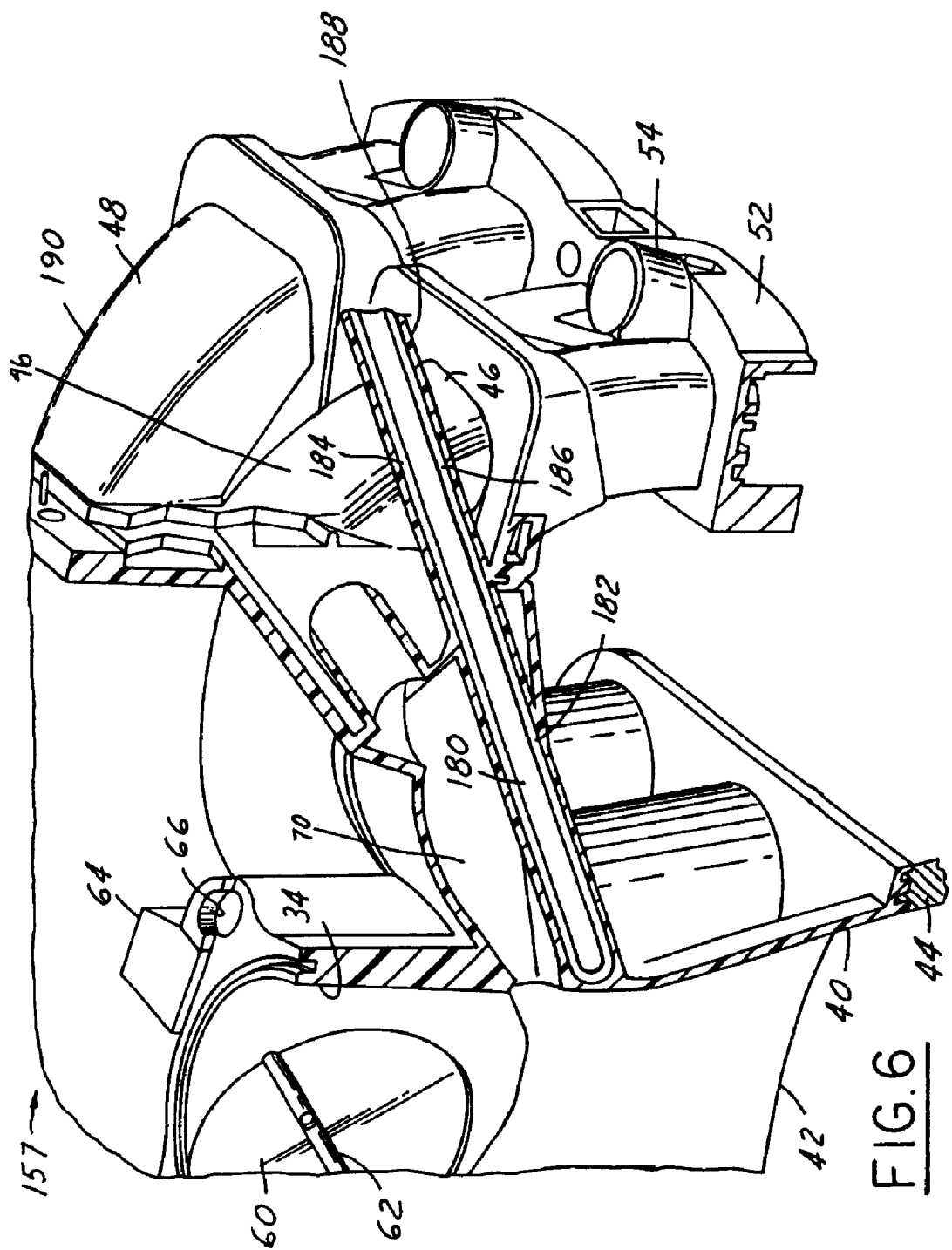
FIG. 6 is a view similar to FIG. 5 of an alternative preferred embodiment intake manifold.

FIG. 6 is a view similar to that of FIG. 5 of an alternate preferred embodiment manifold 157 according to the present invention with like items being given similar reference numerals. A heat generator 180 is provided by a serpentine tubular passage 182. The passage 182 circulates engine coolant down through a leg 184 and then up through a leg 186. The legs 184, 186 are integral with the top portion 190. Passage legs 184, 186 are connected via extension 188. Extension 188 is connected with coolant system hoses via connection necks (not shown). In a similar fashion as described, the passage 182 heats the positive crankcase ventilation passage 70 and transfers heat to the throttle body to alleviate potential freeze-up problems.

While preferred embodiments of the present invention have been disclosed, it is to be understood that they have been disclosed by way of example only and that various modifications can be made without departing from the spirit and scope of the invention as it is encompassed by the following claims.

What is claimed is:

1. An intake manifold for a reciprocating piston internal combustion engine, comprising:

an intake venturi passage for throttled passage of filtered air into a plenum;

a positive crankcase ventilation passage having a first end intersecting with said venturi passage and a second end intersecting with an outer boundary of said manifold, a distance between said first and second ends being a major portion of the diameter of said venturi passage; and a heat pipe adjacent a major portion of said ventilation passage for transfer of thermal energy thereto for preventing freeze up in said ventilation passage, said heat pipe having a portion heated by contact with engine coolant.

2. An intake manifold as described in claim 1, wherein said heat pipe has a T head for passage of engine coolant.

3. An intake manifold as described in claim 1, wherein said intake manifold is fabricated from multiple polymeric pieces sonically welded together and wherein said heat pipe is a metallic.

4. An intake manifold as described in claim 1, wherein said intake manifold additionally incorporates a filter housing.

5. An intake manifold as described in claim 1, wherein said heat pipe additionally transfers heat to a throttle body connected with said venturi passage.

6. An intake manifold as described in claim 1, wherein said intake manifold is mainly fabricated from a polymeric material.

7. An intake manifold as described in claim 1, wherein said intake manifold is made from multiple pieces sonically welded together.

8. An intake manifold as described in claim 1, wherein said heat pipe is a metallic member.

* * * * *